(12) United States Patent
Goel et al.

(10) Patent No.: US 8,200,776 B2
(45) Date of Patent: Jun. 12, 2012

(54) METHODS AND APPARATUS FOR NETWORK PRESENCE DETECTION

(75) Inventors: Amit Goel, Patparganj (IN); Michael J. Krack, Los Altos, CA (US); Ronald S. Rozensky, Bradenton, FL (US); Ernest Lee Shero, McKinney, TX (US); Roy V. Witcher, New Port Richey, FL (US)

(73) Assignee: Avaya Inc., Basking Ridge, NJ (US)

( * ) Notice: Subject to any disclaimer, the term of this patent is extended or adjusted under 35 U.S.C. 154(b) by 475 days.

(21) Appl. No.: 11/449,567

(22) Filed: Jun. 8, 2006

(65) Prior Publication Data

US 2007/0286214 A1    Dec. 13, 2007

(51) Int. Cl.
G06F 15/16    (2006.01)
(52) U.S. Cl. ...................................................... 709/217
(58) Field of Classification Search .................... 709/217
See application file for complete search history.

(56) References Cited

U.S. PATENT DOCUMENTS

| | | | | |
|---|---|---|---|---|
| 2006/0020698 | A1* | 1/2006 | Whipple et al. | 709/224 |
| 2006/0224712 | A1* | 10/2006 | Aho | 709/223 |
| 2006/0225070 | A1* | 10/2006 | Childress et al. | 717/174 |
| 2007/0079013 | A1* | 4/2007 | Tumsi Dayakar et al. | 709/250 |
| 2007/0249365 | A1* | 10/2007 | Jendbro | 455/456.1 |

OTHER PUBLICATIONS

IBM, Learn About IBM Access Connections, Apr. 4, 2004. Retrieved from <http://web.archive.org/web/20040404033848/http://www.pc.ibm.com/us/think/thinkvantagetech/accessconnections.html> on Oct. 14, 2008.*
"Application: Dell QuickSet, Application, Windows 2000, Windows XP, Multi Language, Multi System, v.7.1.8, A36," Downloaded on May 24, 2006, http://support.dell.com/support/downloads/download.aspx?c=us&l=en&s=gen&releaseid=....
"ThinkVantage Access Connections for Windows 2000 and XP—Notebooks," Downloaded on May 24, 2006, http://www-307.ibm.com/pc/support/site.wss/document.do?lndocid=MIGR-4ZLNJB.
"ThinkVantage™ Access Connections Speed dial the network," Downloaded on May 24, 2006, http://www.pc.ibm.com/us/think/thinkvantagetech/accessconnections.html.

* cited by examiner

*Primary Examiner* — Ryan Jakovac

(57) ABSTRACT

Methods and apparatus are provided for controlling a computing device. The behavior of a user of a computing device is observed when the computing device is connected to each of a plurality of networks. A profile is automatically maintained for each of the networks. Each profile contains one or more predefined actions to be performed when the computing device is connected to the corresponding network. The predefined actions are based on the observed behavior. The predefined actions that are recorded in the automatically generated profile and based on the observed behavior can be automatically triggered when the computing device is connected to the network associated with the profile.

16 Claims, 6 Drawing Sheets

```
450 — If default gateway or IP address is changed for any network interfaces then
460 —   If an existing profile is found, then use the existing profile
        Else         (this is learning-mode!)
            For each registered network reliant application
                Ping the IP address of the host for the network reliant application OR connect
                    to default (registered) port for the application
                If no response/port not accessible
470                 Ping the backup host IP address OR connect to default (registered) port for the application
                    If no response/port not accessible, skip this network reliant application
                    End if
                End if
            End for
            If a majority (>50%) of all network reliant application hosts are pingable/reachable
480             Start up those applications whose host IP address is pingable/reachable
                Save_Configuration
            End if
            If a minority (<50%) of all network reliant application hosts are pingable/reachable
                Start VPN application
490             If user cancels VPN application change proxy settings to default
                Save_Configuration
            End if
        Else
        End if
End loop
```

FIG. 3

NETWORK PRESENCE DETECTION PROFILE TABLE – 300

| PROFILE NAME 310 | NETWORK PORT 320 | DEFAULT GATEWAY 330 | DNS ENTRIES 335 | APPLICATIONS 340 | IP ADDRESS OR RANGE 350 | BROWSER SETTINGS 360 |
|---|---|---|---|---|---|---|
| DEFAULT | ETHERNET PORT 1 | 192.168.10.1 | AUTOMATICALLY DETECT | INTERNET EXPLORER | 192.168.10.0/24 | AUTOMATICALLY DETECT SETTINGS |
| HOME | ETHERNET PORT 1 AND VPN ADAPTER PORT 1 | 124.39.91.1 AND 135.19.12.1 | 124.39.92.18 | VPN REMOTE, MESSAGE MANAGER, IP SOFTPHONE, OUTLOOK, VNC, HUMMINGBIRD EXCEED | 124.39.91.0/24 AND 135.1.6.0/24 | USE PROXY, ADDRESS fl.proxy.acme.com: 8000, BYPASS PROXY FOR LOCAL ADDRESSES, EXCEPTION "*.acme.com;135.*.*.*" |
| OFFICE | ETHERNET PORT 1 | 135.1.6.1 | 135.1.10.15 | MESSAGE MANAGER, OUTLOOK, VNC, HUMMINGBIRD EXCEED | 135.1.6.0/24 | USE PROXY, ADDRESS fl.proxy.acme.com: 8000, BYPASS PROXY FOR LOCAL ADDRESSES, EXCEPTION "*.acme.com;135.*.*.*" |
| COFFEE HOUSE | WIRELESS ETHERNET PORT 1 | 192.168.10.1 | AUTOMATICALLY DETECT | INTERNET EXPLORER, OPERA 9, FIREFOX 1 | 192.168.10.1/24 | AUTOMATICALLY DETECT SETTINGS |
| CUSTOMER ACME-ON SITE | WIRELESS ETHERNET PORT 1 | 62.119.5.1 AND 135.19.12.1 | 62.119.7.5 | VPN REMOTE, NETMEETING, POWERPOINT | 62.119.5.0/24 AND 135.1.6.0/24 | USE AUTOMATIC CONFIGURATION SCRIPT |
| OFFICE- TRAVEL | ETHERNET PORT 1 OR WIRELESS ETHERNET PORT 1 | 135.126.11.1 | 135.126.11.2 | IP SOFTPHONE, MESSAGE MANAGER, OUTLOOK, VNC, HUMMINGBIRD EXCEED | 135.125.0.0/16 | USE PROXY, ADDRESS co.proxy.acme.com: 8000, BYPASS PROXY FOR LOCAL ADDRESSES, EXCEPTION "*.acme.com;135.*.*.*" |

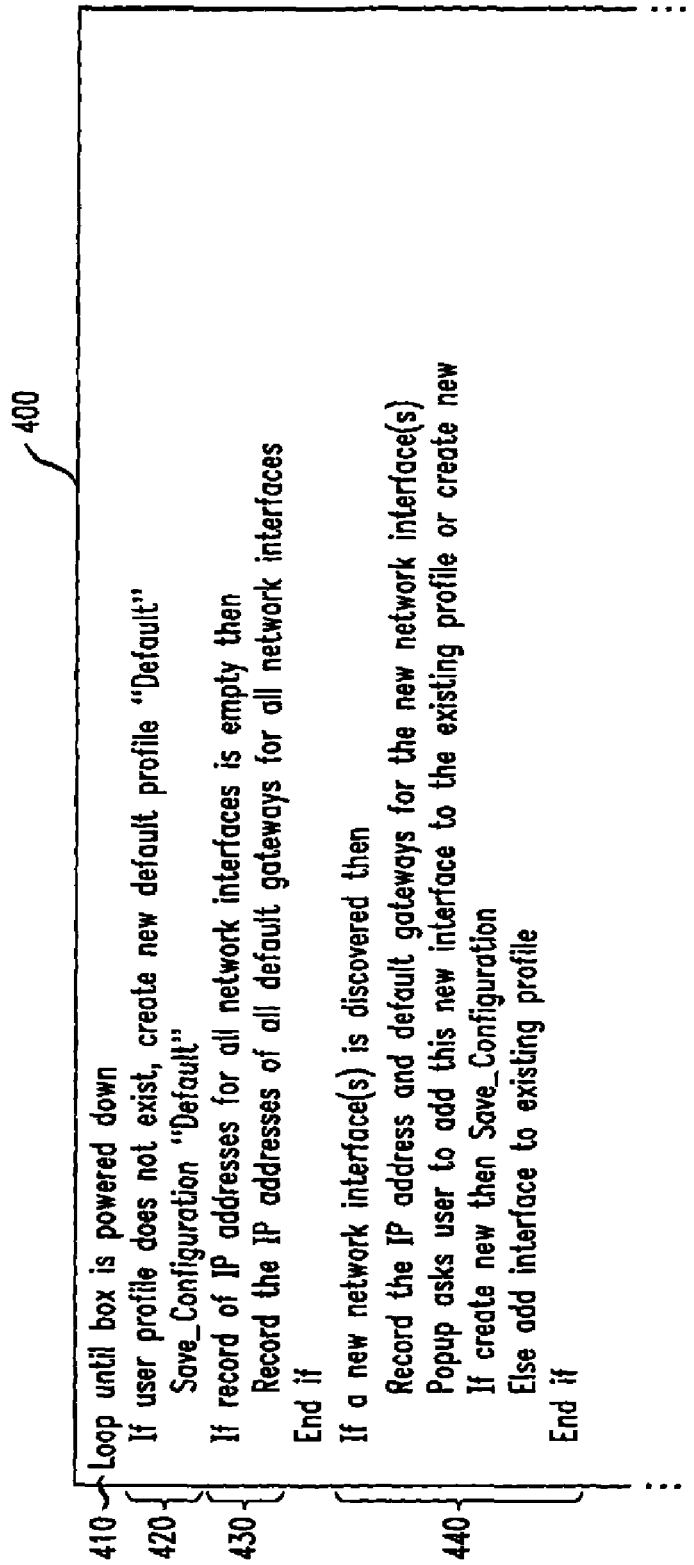

FIG. 4A

```
410 — Loop until box is powered down
420 —   If user profile does not exist, create new default profile "Default"
            Save_Configuration "Default"
430 —   If record of IP addresses for all network interfaces is empty then
            Record the IP addresses of all default gateways for all network interfaces
        End if
440 —   If a new network interface(s) is discovered then
            Record the IP address and default gateways for the new network interface(s)
            Popup asks user to add this new interface to the existing profile or create new
            If create new then Save_Configuration
            Else add interface to existing profile
        End if

{FROM FIG. 4A}
...

450 — If default gateway or IP address is changed for any network interfaces then
460 — If an existing profile is found, then use the existing profile
       Else
         (this is learning-model)
470 — For each registered network reliant application
         Ping the IP address of the host for the network reliant application OR connect
           to default (registered) port for the application
         If no response/port not accessible
           Ping the backup host IP address OR connect to default (registered) port for the application
           If no response/port not accessible, skip this network reliant application
         End if
       End for
480 — If a majority (>50%) of all network reliant application hosts are pingable/reachable
         Start up those applications whose host IP address is pingable/reachable
         Save_Configuration
       End if
490 — If a minority (<50%) of all network reliant application hosts are pingable/reachable
         Start VPN application
         If user cancels VPN application change proxy settings to default
         Save_Configuration
       End if
     Else
   End if
End loop

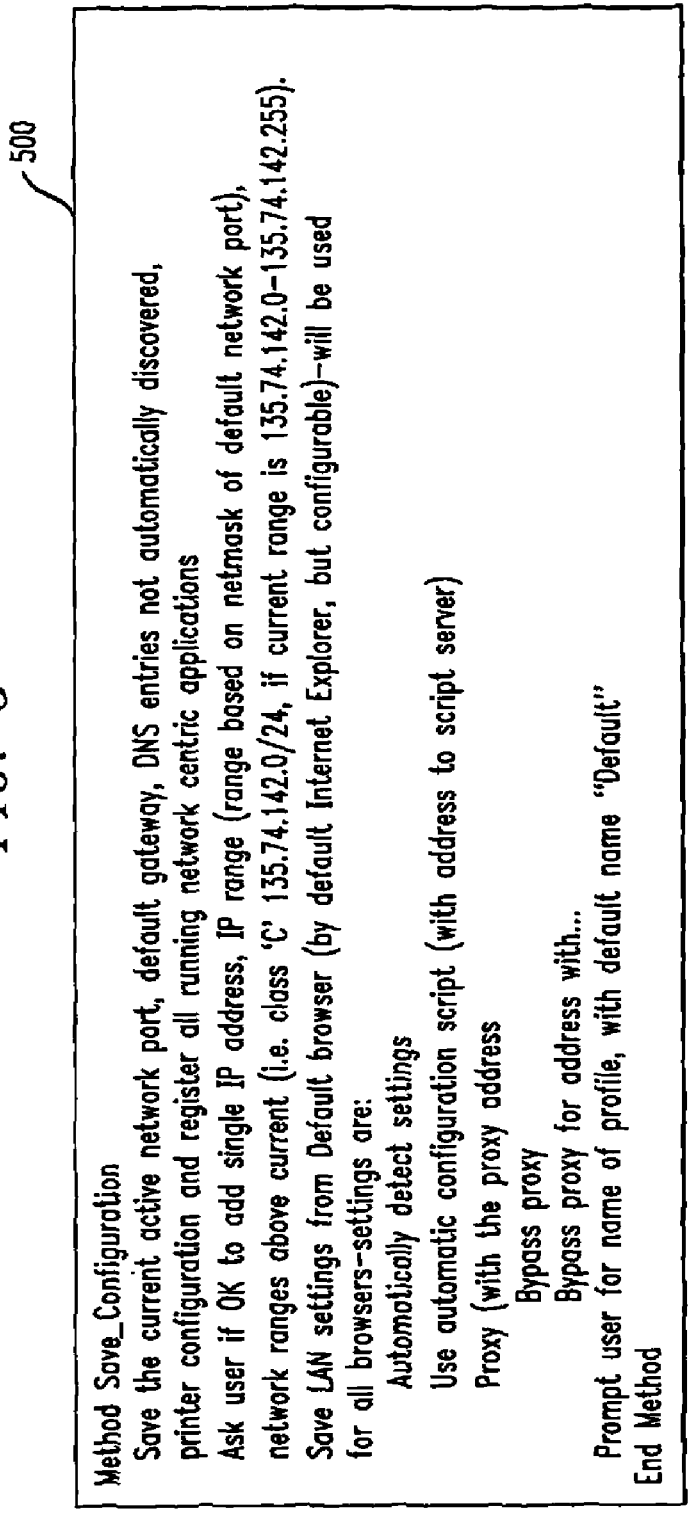

FIG. 5

```
Method Save_Configuration
    Save the current active network port, default gateway, DNS entries not automatically discovered,
    printer configuration and register all running network centric applications
    Ask user if OK to add single IP address, IP range (range based on netmask of default network port),
    network ranges above current (i.e. class 'C' 135.74.142.0/24, if current range is 135.74.142.0-135.74.142.255).
    Save LAN settings from Default browser (by default Internet Explorer, but configurable)—will be used
    for all browsers—settings are:
        Automatically detect settings
        Use automatic configuration script (with address to script server)
        Proxy (with the proxy address
            Bypass proxy
            Bypass proxy for address with...
    Prompt user for name of profile, with default name "Default"
End Method
```

METHODS AND APPARATUS FOR NETWORK PRESENCE DETECTION

FIELD OF THE INVENTION

The present invention relates generally to the field of computer networking and more particularly, to techniques for connecting portable computers to different networks.

BACKGROUND OF THE INVENTION

The proliferation of portable computing devices and wireless networks make it easier than ever for users to obtain access to a network from almost any location. Portable computers, such as laptops, are now sold with multiple network interfaces, providing compatibility with various networking standards.

When a user moves a computer from one network to another, the user may routinely shut down and then restart the same applications. For example, when a user arrives at the office, the user may typically dock his or her laptop computer on a docking station, connect to the office network and then start a number of applications, such as Microsoft Outlook, Message Manager, Secure Shell, and X-Windows. When the user leaves the office at the end of the work day, the user would typically close one or more of these applications, as they cannot work without a network connection. When the user arrives at home, the user might routinely plug the laptop computer back in, then start a Virtual Private Network (VPN) connection to the office network, and restart a number of applications, perhaps including some of the same applications that were used in the office.

A number of techniques have been proposed or suggested for automating such types of computing tasks. Microsoft Windows™, for example, provides the ability to automatically start applications. In addition, Netswitcher™ is a tool that automates the modification of network interface configurations from one network to another. See, for example, http://www.netswitcher.com.

While such existing techniques for automating computing tasks have helped to increase the efficiency of the user's computing experience, there are a number of limitations, which if overcome, could further increase the efficiency and reliability of the user computing experience. In particular, a need still exists for methods and apparatus for automatically learning the applications and configuration settings employed by a user when connected to various networks and automatically configuring the user's computer based on the current network.

SUMMARY OF THE INVENTION

Generally, methods and apparatus are provided for controlling a computing device. According to one aspect of the invention, the behavior of a user of a computing device is observed when the computing device is connected to each of a plurality of networks. A profile is automatically maintained for each of the networks. Each profile contains one or more predefined actions to be performed when the computing device is connected to the corresponding network. The predefined actions are based on the observed behavior.

For example, the observed behavior for a given network can comprise (i) launching one or more applications, optionally with a particular configuration; (ii) configuring one or more hardware devices; (iii) establishing a network connection to one or more servers required by an application associated with the network; or (iv) establishing a connection to a private network.

According to a further aspect of the invention, the predefined actions that are recorded in the automatically generated profile and based on the observed behavior can be automatically triggered when the computing device is connected to the network associated with the profile. The network can be identified, for example, by evaluating one or more of an IP address, a range of IP addresses or a network type.

A more complete understanding of the present invention, as well as further features and advantages of the present invention, will be obtained by reference to the following detailed description and drawings.

BRIEF DESCRIPTION OF THE DRAWINGS

FIG. 3 is a sample table from an exemplary network presence detection profile;

FIGS. 4A and 4B, collectively, provide pseudo code for an exemplary implementation of the network presence detection processes incorporating features of the present invention; and FIG. 5 provides pseudo code for an exemplary implementation of the save configuration process incorporating features of the present invention.

DETAILED DESCRIPTION

The present invention provides methods and apparatus for network presence detection. According to one aspect of the invention, the network (or network type) that a computer is connected to is identified and one or more predefined actions are performed based on the network identification, such as launching a predefined set of applications. The present invention recognizes that the network connection habits of a user are often a very repetitive and reproducible process. According to another aspect of the invention, the network connection habits of a user are automatically learned for a plurality of networks and a profile is created for each network. As used herein, the term "portable computer" shall include any computing device that can be connected to different networks at different times, including, without limitation, notebooks, laptops, handheld computers, palmtops, personal digital assistants (PDAs), and desktop computers.

Figure 1:
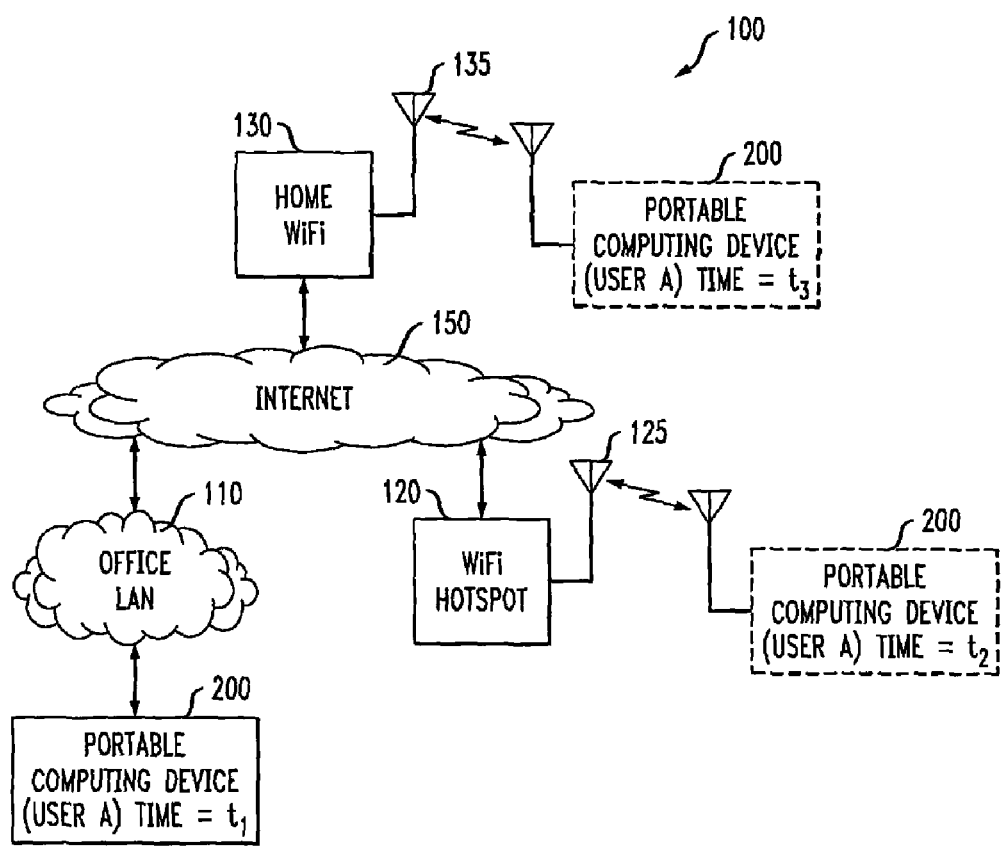
FIG. 1 illustrates an exemplary network environment in which the present invention can operate.
Figure 2:
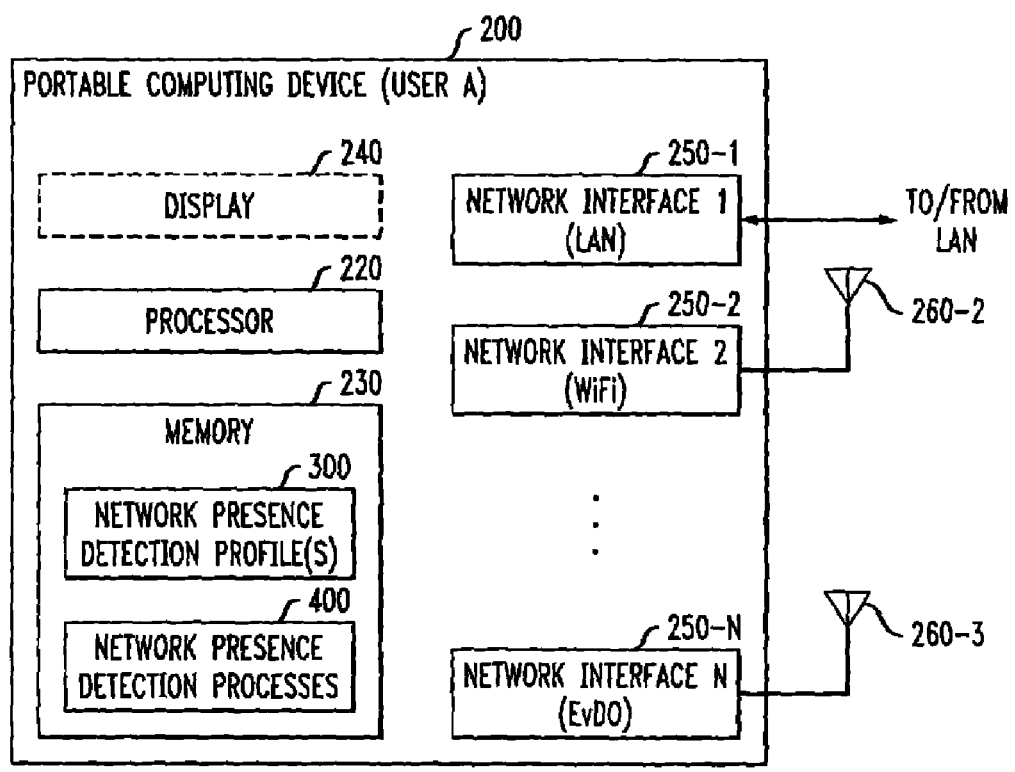
FIG. 2 is a block diagram of an exemplary portable computing device that can implement the processes of the present invention.

FIG. 1 illustrates an exemplary network environment 100 in which the present invention can operate. As shown in FIG. 1, a user portable computing device 200, discussed further below in conjunction with FIG. 2, is connected to different networks at different times. The exemplary network environment 100 is comprised of the Internet 150; as well as a Local Area Network (LAN) 110, associated with, for example, an office; a Wireless Fidelity (WiFi) "hotspot" 120, based, for example, on the IEEE 802.11b wireless networking standard, and a home WiFi network 130. The WiFi networks 120 and 130 may include antennas 125, 135, respectively. The WiFi "hotspot" 120 may be associated with a public location, such as a coffee house.

In the exemplary embodiment shown in FIG. 1, the portable computing device 200 is connected to the office LAN 110 at a time $t_1$, to the WiFi hotspot 120 at a time $t_2$ and to the home WiFi network 130 at a time $t_3$. The present invention applies, however, to any network that allows computer devices to communicate, as would be apparent to a person of ordinary skill in the art, including, for example, connections that employ a modem, Firewire connection (IEEE 1394), serial, parallel, Infrared or BlueTooth connection. Each connection type may have a profile, or be part of an existing profile, as discussed further below in conjunction with FIG. 3.

Although not shown in FIG. 1, one or more of the networks 110, 120, 130 in the network environment can employ computer security and access control techniques, for example, using a firewall. In addition, one or more of the networks 110, 120, 130 may provide a VPN interface that allows a user to access a private network. In yet another variation, one or more of the networks 110, 120, 130 may employ one or more proxies for users that access the Internet. The present invention can be employed to automatically configure one or more of such firewalls, VPNs, and proxies based on an identification of the active network interface. In addition, one or more of such firewalls, VPNs, and proxies can optionally be automatically activated or deactivated based on identification of the active network interface.

As used herein, the term "private network" is the non-public network of a user that is behind a firewall or other security appliance, that may be connected to, for example, via direct connection (i.e., network cable). A public network is an unsecured public network from which virtually anyone may connect, such as the networks of public libraries, airports, "hot-spots," cable-modem, and DSL-modem. A "VPN to private network" is established when a user connects to his or her non-public (private) network utilizing a VPN that secures their connection. This connection may be made over the public network or via wireless appliances controlled by the user's organization.

In addition, the term "network reliant applications" includes those applications whose primary focus is the communication with other applications not executing on the users computer, such that their functionality is either severely impaired or rendered non-usable when not connected to the private network. In one exemplary embodiment of the present invention, when a user connects his or her computer to one of the above networks, the disclosed algorithms detect the change and automatically launch network reliant applications, based on historical usage.

FIG. 2 is a block diagram of an exemplary portable computing device 200 that can implement the processes of the present invention. The portable computing device 200 may be embodied as any computing device that can be connected to different networks at different times, including, for example, notebook computers, laptops, handheld computers, palmtops, personal digital assistants (PDAs), cellular telephones, and desktop computers.

As shown in FIG. 2, a memory 230 configures the processor 220 to implement the network presence detection methods, steps, and functions disclosed herein. For example, as shown in FIG. 2 and discussed further below in conjunction with FIGS. 3 through 5, the memory 230 stores one or more network presence detection profile(s) 300 and network presence detection processes 400 that incorporate and implement features and functions of the present invention.

The memory 230 could be distributed or local and the processor 220 could be distributed or singular. The memory 230 could be implemented as an electrical, magnetic or optical memory, or any combination of these or other types of storage devices. It should be noted that each distributed processor that makes up processor 220 generally contains its own addressable memory space. It should also be noted that some or all of system 200 can be incorporated into an application-specific or general-use integrated circuit. The portable computing device 200 optionally includes a display 240.

According to one aspect of the invention, the portable computing device 200 includes one or more network interfaces 250-1 through 250-N. In the exemplary implementation shown in FIG. 2, the portable computing device 200 includes a LAN network interface 250-1, a WiFi network interface 250-2 and an Evolution Data Only (EvDO) network interface 250-N (optimized version of CDMA 2000). The wireless network interfaces 250, such as network interfaces 250-2 and network interfaces 250-N, typically have associated antennas 260-2 and 260-3 for wireless communication with a remote antenna.

FIG. 3 is a sample table from an exemplary network presence detection profile 300. Generally, the network presence detection profile 300 records the network information for a user that is employed by the present invention to automatically launch, and configure if and when necessary or when network presence detection is configured to automatically configure applications that will be launched, one or more applications upon connection to a new network. The information recorded in the network presence detection profile 300 may be obtained from the user during a registration process, or learned by observing the behavior of the user on different networks.

As shown in FIG. 3, the exemplary network presence detection profile 300 comprises a number of different profiles (sometimes referred to as sub-profiles), each associated with a different network that the user has used. For each profile, the network presence detection profile table 300 records a corresponding profile name in field 310, the network port in field 320, the Default Gateway for the connection in field 330, DNS entries 335, the applications used by the user with the network connection in field 340, the IP Address or Range associated with the connection in field 350 and the Browser Settings in field 360. The manner in which the information recorded in the network presence detection profile 300 is collected and employed by the present invention is discussed further below in conjunction with FIGS. 4 and 5. Thus, the user profiles 300 for network presence allow users to configure profiles based on IP address ranges or IP addresses. The information recorded in the exemplary network presence detection profile 300 is for illustration purposes only, and additional fields can be added, as would be apparent to a person of ordinary skill in the art. For example, the exemplary network presence detection profile 300 can be extended to include information about the configuration of one or more printers or other hardware devices for each network.

It is noted that users can register the applications recorded in field 340, for example, by right-clicking the application in the Windows Taskbar (or similar method for other operating systems, where appropriate) and selecting "Register with Network Profile [profile name]." Again, the present invention can also learn the applications employed by the user for each network connection by observing the behavior of the user.

The applications that are started when the portable computing device is connected to a given network may thus depend on the user profile 300. This will vary, depending on whether the user is connected directly to the private network, connecting through the VPN of a wired network port, or connecting through the VPN of a wireless network port. For example, if the user is in the office and connects portable computing device through a physical connection, he or she may not use IP Softphone (office profile), but want the applications Microsoft Outlook and Message Manager to start. However, if the same user is connecting through a VPN on a physical connection, he or she may be working from home and need IP Softphone (virtual office profile), in addition to Microsoft Outlook and Message Manager. When connecting using a VPN over the wireless connection, he or she may be outside the office and using a public hotspot (hotspot profile), and not desire any network applications to start.

In addition to identifying one or more applications to launch for each network connection, the network presence detection profile 300 may also record one or more configuration parameters for the applications. The user profiles 300 thus allow users to configure and start applications according to their preferences. For example, while traveling a user may prefer that IP Softphone be started in "Road Warrior" mode but while working in a virtual office, the same user may prefer "Telecommuter" mode.

FIGS. 4A and 4B, collectively, provide pseudo code for an exemplary implementation of the network presence detection processes 400 incorporating features of the present invention. Generally, the network presence detection process 400 identifies the network (or network type) that a computer is connected to, and performs one or more predefined actions based on the network identification, such as launching a predefined set of applications and configuring them as necessary.

In the exemplary embodiment shown in FIG. 4A, the network presence detection process 400 continuously loops during step 410 until the computing device is powered down. In a further variation, the network presence detection process 400 can be activated at periodic intervals to evaluate whether there were any changes in the network configuration, as would be apparent to a person of ordinary skill in the art.

In section 420, a user profile 300 is created, if one does not already exist. In section 430, the network presence detection process 400 records IP addresses of all default gateways (i.e., a router on the network of the user's Internet Service Provider) for all the active network interfaces 250. In a further variation, the user can optionally be prompted to record an IP Address range, as opposed to a single IP Address, for one or more network interface(s).

During section 440, the network presence detection process 400 continues to monitor the network configuration for a new network interface 250. If a new network interface(s) is discovered, then the IP address and default gateways for the new network interface(s) 250 are recorded, and the user can optionally by prompted to ask whether the new interface should be added to an existing profile 300 or whether a new profile 300 should be created. A new profile is created using a save configuration subroutine 500, discussed further below in conjunction with FIG. 5.

As shown in FIG. 4B, if is detected that the default gateway or IP address is changed for any network interfaces during line 450, then an existing profile is used during step 460, if it exists.

If an existing profile is not found, then information for the profile is obtained during section 470 in a learning-mode. Generally, sections 470 and 480 determine whether a connection to a VPN is required. In the exemplary embodiment shown in FIG. 4B, for each registered network reliant application, the IP address of the host for the network reliant application is pinged, or a connection is established to the default (registered) port for the application. If there is no response or the port is not accessible, then the backup host IP address is pinged, or a connection is established to the default (registered) port for the application.

If it is determined during section 480 that a majority, for example, more than 50%, of all network reliant application hosts are pingable/reachable, then those applications whose host IP address is pingable/reachable are started, and the configuration is saved using the subroutine 500 of FIG. 5.

If it is determined during section 490 that a minority, for example, less than or equal to 50%, of all network reliant application hosts are pingable/reachable, then the VPN application is launched. If the user cancels the VPN application, then the proxy settings are changed to the default profile 300, and the configuration is saved using the subroutine 500 of FIG. 5. In a further variation, the network presence detection process 480 and 490 can be configured from 0% to 100%.

FIG. 5 provides pseudo code for an exemplary implementation of the save configuration process 500 incorporating features of the present invention. As shown in FIG. 5, the save configuration process 500 saves the current active network port and default gateway, and registers all running network centric applications. The user can be queried whether to add a single IP address, IP range (range based, for example, on netmask of default network port), or network ranges above current (e.g., class "C" 135.74.142.0/24, if current range is 135.74.142.0-135.74.142.255). The LAN settings are then saved from the default browser, which can be configured by the user. For example, the proxy, configuration script and bypass proxy can be automatically detected. The user is then prompted for a name for the profile. In a further variation, the network presence detection process 500 can save the configuration of other applications, such as, for example, Microsoft Exchange, Message Manager, IP SoftPhone, or other devices, such as printers.

While FIGS. 4A, 4B, and 5 show examples of a sequence of steps, it is also an embodiment of the present invention that the sequence may be varied. Various permutations of the algorithm are contemplated as alternate embodiments of the invention.

While exemplary embodiments of the present invention have been described with respect to processing steps in a software program, as would be apparent to one skilled in the art, various functions may be implemented using digital logic blocks, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, digital video disks, memory cards, semiconductor devices, chips, application specific integrated circuits (ASICs), network addressable storage (NAS)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method comprising:
   transmitting, from a computing device, a plurality of messages in response to a default gateway for a network interface of the computing device changing to a first telecommunications network, wherein each message is transmitted to a host server of one of a plurality of network-reliant applications;
   if a majority of all host servers to which a message is transmitted respond to their respective messages, then responsively launching, at the computing device, the network-reliant applications whose host servers responded; and
   if a minority of the host servers to which a message is transmitted respond to their respective messages, then responsively launching, at the computing device, a virtual private network (VPN) client.

2. The method of claim 1 further comprising:
   at the computing device, connecting to a second telecommunications network;
   identifying a first set of network-reliant applications which are executing when the computing device is connected to the second telecommunications network;
   identifying a host server to which each network-reliant application is connected; and
   wherein the plurality of messages is transmitted to the hosts of the network reliant applications from the first set.

3. The method of claim 1 comprising storing, at the computing device, a profile record for the first telecommunications network, wherein the profile record relates the started applications to the first telecommunications network.

4. The method of claim 1, wherein the messages for the host servers of each of the plurality of network-reliant applications are transmitted only when a profile record for the first telecommunications network does not exist on the computing device.

5. The method of claim 1 comprising:
   receiving a signal which indicates a shutting down of the virtual private network (VPN) client and responsively loading a default network profile.

6. The method of claim 1 comprising establishing a connection to a private network after the virtual private network (VPN) client is launched.

7. The method of claim 2, comprising: storing profile record for the second telecommunications network which relates an indication of the configuration settings for at least one of the identified network-reliant applications to the second telecommunications network.

8. The method of claim 1, wherein the connection to the first telecommunications network is detected by evaluating one or more of an IP address, a range of IP addresses or a network type.

9. A method comprising:
   transmitting, from a computing device, a plurality of messages in response to the computing device connecting to a first telecommunications network, wherein each message is transmitted to a host server of one of a plurality of network-reliant applications;
   if N host servers of all host servers to which a message is transmitted respond to their respective messages, then responsively launching, at the computing device, the network-reliant applications whose host servers responded; and
   if N host servers of all host servers to which the message is transmitted fail to respond to their respective messages, then responsively launching, at the computing device, a virtual private network (VPN) client;
   wherein N is an integer greater than one.

10. The method of claim 9 further comprising:
    at the computing device, connecting to a second telecommunications network;
    identifying a first set of network-reliant applications which are executing when the computing device is connected to the second network;
    identifying a host server to which each network-reliant application is connected; and
    wherein the plurality of messages is transmitted to the hosts of the network reliant applications from the first set.

11. The method of claim 9 comprising storing, at the computing device, a profile record for the first telecommunications network, wherein the profile record relates the started applications to the first telecommunications network.

12. The method of claim 9, wherein the messages for the host servers of each of the plurality of network-reliant applications are transmitted only when a profile record for the first telecommunications network does not exist on the computing device.

13. The method of claim 9 comprising:
    receiving a signal which indicates a shutting down of the virtual private network (VPN) client and responsively loading a default network profile.

14. The method of claim 9 comprising establishing a connection to a private network after the virtual private network (VPN) client is launched.

15. The method of claim 10, comprising: storing profile record for the second telecommunications network which relates an indication of the configuration settings for at least one of the identified network-reliant applications to the second telecommunications network.

16. The method of claim 9, wherein the connection to the first telecommunications network is detected by evaluating one or more of an IP address, a range of IP addresses or a network type.

* * * * *